C. H. MATCHETT.
Saw-Filing Vises and Guides.
No. 154,557. Patented Sept. 1, 1874.
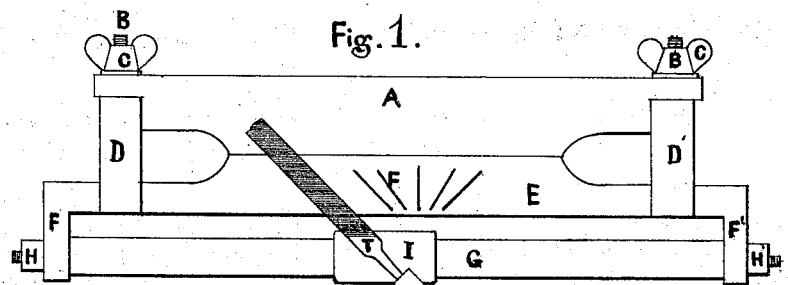
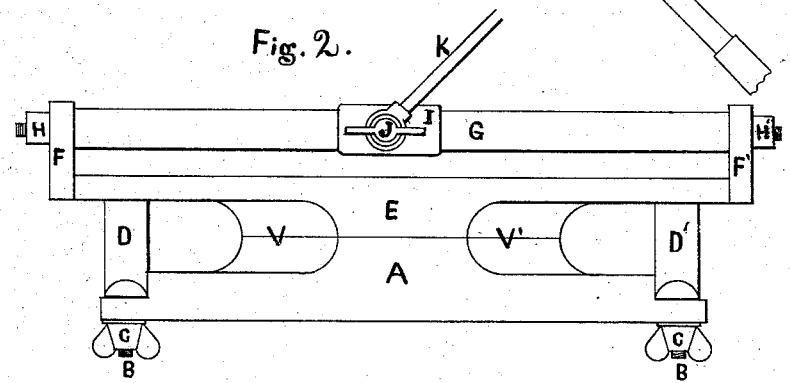
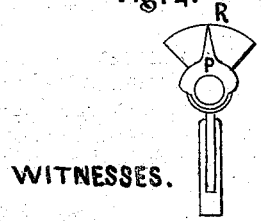
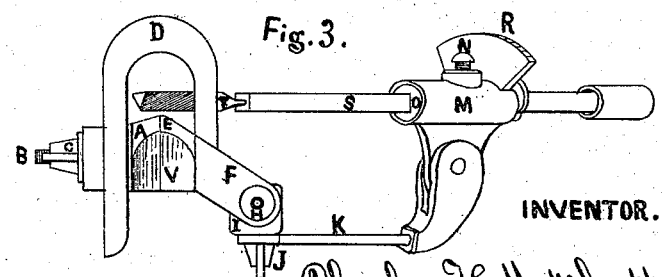
WITNESSES.
H. S. Talbot
John Tobin
INVENTOR.
Charles H. Matchett
Per Sylvenus J. Walker
Att'y

UNITED STATES PATENT OFFICE.

CHARLES H. MATCHETT, OF SOMERVILLE, MASSACHUSETTS.

IMPROVEMENT IN SAW-FILING VISES AND GUIDES.

Specification forming part of Letters Patent No. 154,557, dated September 1, 1874; application filed June 17, 1874.

*To all whom it may concern:*

Be it known that I, CHARLES H. MATCHETT, of Somerville, in the county of Middlesex and State of Massachusetts, have invented certain new and useful Improvements in Vise and Guides for Filing Saws, of which the following is a specification:

The object of my invention is to provide a cheap, simple, and convenient means of holding hand or other straight saws to be filed, and combining therewith a compact adjustable guide for directing the course or angle of the file in its movements across the saw in the act of filing, so as to enable any one, however unskilled, to file a saw in a true and even manner on both sides alike, giving each tooth the requisite rake and pitch necessary to fit such saw to cut smooth and rapidly, either as a splitting or cutting-off saw; and it consists, first, of a pair of adjustable jaws, one of which moves on guides or bolts, so constructed as to open and close parallel, being connected or supported by rigid curved arms instead of a hinge-joint, as heretofore; also, in certain recesses formed in the under side of such jaws, so as to admit the handle of the saw to pass into such when desired to file at or near the heel of the same; and it further consists in the combination, with such jaws, of certain guide-bars, indexes, and adjusting mechanisms as will insure the passage of the file across the saw in any desired angle to which it may be set, both as to the pitch vertically and diagonally, so that when one side is filed the file-guide may be set on the exact angles in the opposite directions, so as to cause the teeth to be filed on both sides exactly alike; and, when not in use, can be folded up in a very compact form, so as to occupy but little space.

Figure 1 is a top-plan view of my invention. Fig. 2 is a reverse-plan view. Fig. 3 is an end view. Fig. 4 is a view of the indicator.

A represents an adjustable jaw, which is movable by means of bolts B and thumb-screws C, which are connected to the curved arms D D', their lower ends being provided with screw-holes, by which they may be fastened to the edge of a bench. E is a stationary jaw, provided at each end with lugs F F', between which is pivoted the flat guide-bar G, fitted with bolts as journals or pivots at each end, which pass through the lugs F F', and is held in the position desired by means of nuts H H'. Upon this bar is fitted a slide, I, which is slid along as each tooth is filed. To the under side of this slide is a thumb-screw, J, which confines the arm K in the position or angle desired to give the proper bevel to the front edge of the tooth desired, being set by the lines L upon the top of the stationary jaw E, which lines radiate in either direction from the center, so as to file the teeth on both sides of the saw alike. To the outer end of this arm K is pivoted an adjustable file-carrier guide-box, M, having a set-screw, N, to secure the inner tube O in the position, as shown by the pointer P, on the outer end of the same. R is an indicator connected to the top of the guide-box M. Through the tube O freely slides the square bar S or file-carrier, to the end of which the file T is connected. The joint at the end of arm K permits the box M to tip so as to raise the file up from between the teeth after a tooth has been filed, previous to filing the next tooth upon that side of the saw. V V' are openings formed between the lower portion of the faces of the jaws, to admit a saw-handle to pass into either of such openings when desirable to file near the heel of the saw.

Having thus described my invention, what I claim is—

1. The combination of the adjustable jaw A, bolts B, and thumb-screws C with curved arms D D', and stationary jaw E, and openings V V', when constructed and arranged to operate substantially in the manner described, as and for the purposes set forth.

2. In combination with jaws A and E, the latter having the lugs F F', the adjustable flat guide-bar G, slide I, arm K, guide-box M, tube O, pointer P, indicator R, and file-carrier bar S, when all are combined, constructed, and arranged to operate substantially in the manner described, as and for the purposes set forth.

CHARLES H. MATCHETT.

Witnesses:
SYLVENUS WALKER,
J. E. BATES.